(12) United States Patent
Vesterinen et al.

(10) Patent No.: US 7,664,073 B2
(45) Date of Patent: Feb. 16, 2010

(54) METHOD FOR PERFORMING A MOBILE USER TERMINAL ROUTE UPDATE IN A TELECOMMUNICATION NETWORK OPERATED BASED ON THE INTERNET PROTOCOL

(75) Inventors: Seppo Vesterinen, Oulunsalo (FI); Tomi Tarvainen, Espoo (FI); Pekka Korja, Helsinki (FI); Jussi Sipola, Oulu (FI)

(73) Assignee: Nokia Corporation, Espoo (FI)

( * ) Notice: Subject to any disclaimer, the term of this patent is extended or adjusted under 35 U.S.C. 154(b) by 1422 days.

(21) Appl. No.: 10/311,715

(22) PCT Filed: Feb. 6, 2001

(86) PCT No.: PCT/EP01/01258

§ 371 (c)(1),
(2), (4) Date: Oct. 30, 2003

(87) PCT Pub. No.: WO01/99458

PCT Pub. Date: Dec. 27, 2001

(65) Prior Publication Data

US 2004/0066777 A1   Apr. 8, 2004

(30) Foreign Application Priority Data

Jun. 20, 2000   (EP) .................................... 005685

(51) Int. Cl.
*H04Q 7/00*   (2006.01)
*H04L 12/28*   (2006.01)
*H04W 36/00*   (2006.01)

(52) U.S. Cl. .................. 370/331; 370/401; 455/436

(58) Field of Classification Search ................ 370/328, 370/331, 389, 400, 401; 455/432.1, 433, 455/436–440
See application file for complete search history.

(56) References Cited

U.S. PATENT DOCUMENTS 6,473,411 B1* 10/2002 Kumaki et al. ............. 370/331
6,473,413 B1* 10/2002 Chiou et al. ................ 370/331
6,487,406 B1* 11/2002 Chang et al. ............. 455/422.1
6,539,237 B1*  3/2003 Sayers et al. ................ 455/555
6,654,359 B1* 11/2003 La Porta et al. ............. 370/328
6,917,600 B1*  7/2005 Chuah et al. ................ 370/328
7,184,418 B1*  2/2007 Baba et al. .................. 370/331
2003/0186694 A1* 10/2003 Sayers et al. ............. 455/426.1

FOREIGN PATENT DOCUMENTS

| CA | 2287673 | 6/2000 |
| EP | 0 851 633 A2 | 7/1998 |
| EP | 1 009 141 A1 | 6/2000 |

* cited by examiner

Primary Examiner—Hong Cho
(74) Attorney, Agent, or Firm—Foley & Lardner, LLP

(57) ABSTRACT

The present invention is a method for performing a mobile user terminal route update in a telecommunication network operated based on the Internet Protocol, the network comprising at least two network transceiver device gateways each communicating with at least one mobile user terminal, at least one routing element providing a route for a communication connection between a mobile first user terminal and a second user terminal, the second user terminal communicating via a border gateway and the at least one routing element with mobile first user terminal, and wherein each user terminal is identified by an Internet Protocol address, the method comprising the steps of detecting an occurrence of a handoff condition for the mobile first user terminal for a handoff from a first one to a second one of the at least two network transceiver device gateways, initiating a handoff procedure at the mobile first user terminal, the first and the second network transceiver device gateways and the border gateway, and the transmitting the respective Internet Protocol addresses that identify those terminals which are communicating with each other by the corresponding gateway to be associated to the respective terminal after handoff, before completion of the handoff procedure.

19 Claims, 2 Drawing Sheets

METHOD FOR PERFORMING A MOBILE USER TERMINAL ROUTE UPDATE IN A TELECOMMUNICATION NETWORK OPERATED BASED ON THE INTERNET PROTOCOL

BACKGROUND OF THE INVENTION

Field of the Invention

The present invention relates to a method for performing a mobile user terminal route update in a telecommunication network operated based on the Internet Protocol.

In the future the telecommunication networks and particularly the radio access networks thereof will change to adopt a complete Internet Protocol (IP) solution where the cellular base transceiver stations, herein also referred to as network transceiver device gateways, behave as "Last Hop Gateways" of the Internet towards the mobile user terminals. That is, they serve as entry and/or exit points to and/or from the Internet. The IP radio access network can be considered as an autonomous system which provides access to the Internet by using the mobile user terminals.

The basic assumption underlying the current standardization activities of the "MobileIP" workgroup is that the mobile user terminal must be able to communicate using the same IP address at all times, regardless of its point of access to the Internet.

At the moment IPv4 addressing scheme is in use and it will be replaced with IPv6 addressing scheme in future, which will solve the address space problem of the IPv4 addressing scheme for the foreseeable future.

The mobile IP solutions with the IPv4 addressing scheme are rather complex and require the use of so-called tunneling, a Home Agent and a Foreign Agent because originally the Internet host computers were assumed to be connected only to their home network. That is, IPv4 packets must be tunneled if the terminal is connected to the Internet elsewhere than its home network.

In contrast thereto, the IPv6 addressing scheme will allow a mobile terminal host to host connection via Internet by using just terminal IP addresses throughout the network without any address conversions or tunneling, regardless of the mobile terminal host's current point of attachment to the Internet.

Within a radio access network (RAN) the mobile terminals (mobile user terminals) can move rapidly from one base station cell area to another base station cell area during an active connection (between a mobile user terminal and another fixed or mobile user terminal), so that then a handoff to a new serving base station must occur, that is, the IP packets arriving at the mobile user terminal must be directed to the new base station (Last Hop Gateway) in the IP radio access network (IP RAN).

It is to be noted that the expression "base station" as used herein is intended to mean a base transceiver station of the radio access network and is also referred to as network transceiver device gateway, as it represents the gateway in the sense of a kind of an interface from the mobile user terminals to the IP radio access network. Also, such a network transceiver device gateway is intended to mean a so-called Node B in case the radio access network conforms to the UMTS system as presently being defined in the 3$^{rd}$ generation partnership project (3GPP). Likewise, a user terminal may be a mobile user terminal (and/or a mobile terminal host also known as a mobile station) as well as a fixed user terminal (and/or host). Similarly as above, the expression user terminal is intended to be understood in its broadest sense, so that it covers also the case of a user equipment (UE) as a terminal device in a system conforming to UMTS as presently being defined in the 3$^{rd}$ generation partnership project (3GPP).

The handoff procedure must occur fast enough in order to prevent the generation of too long of a break in communications especially when there must be maintained a certain quality of service (QoS) like in a voice call.

As a result of the handoff procedure between base transceiver stations of the IP RAN, the destination of arriving IPv6 packets to the mobile user terminal must be changed in the routing elements of the IP RAN, i.e. the routing elements must be learned to forward packets to a new base transceiver station. On the other hand, the route from the base station towards a border gateway (of the IP RAN) via which the mobile user terminal (mobile host) communicates to a far-end host (fixed or mobile communication partner) must be changed in the routing elements of the IP RAN too, that is, both directions of connection must be updated in the routing elements of the network.

In this connection, it is to be noted that the expression routing element as used in this specification is to be understood in its broadest sense and is not limited to a specific type of routing element. A routing element is an element which routes and/or directs a flow of information between terminals connected to gateways and/or between gateways through an IP network which is present between the gateways. Particularly, the expression routing element means a Layer 3 switch as well as a so-called router, so that the present specification is valid for switched networks (comprising a layer 3 switch as a routing element) as well as for routed networks (comprising a router as a routing element). Also, if in this document reference is made to a mere "switch" as a routing element, this is of course meant to denote a Layer 3 switch as a routing element.

Depending on the IP RAN implementation by using a switched network or routed network, the route learning process (route update process) is somewhat different.

In the switched network solution, it is enough to send, towards the switched network, just one IP packet with the respective host's IP address as a source address via the gateways (transceiver gateway and/or border gateway) via which the hosts are communicating with each other via the IP RAN.

In the routed network solution, a routing table update message must be sent in order to update the new routing direction to the host's IP address.

However, due to fast packet switching requirement during a handoff process, known mechanisms for the route updating process in the IP RAN are not satisfactorily because they are still rather time consuming when compared to the packet switching times.

In all known IP radio access network solutions it becomes possible to implement the host to host connections via Internet by just using the mobile user terminal's IPv6 addresses throughout the network without any address conversions or tunneling, regardless of the mobile terminal's current point of attachment to the Internet.

In a tunneled host to host connection solution, the base stations behave as termination points to the tunnels which can be changed under control of the radio access network when a mobile terminal's point of attachment in the network is moving.

In a tunneled solution, however, there is drawback that the host to host connection IP datagrams must be encapsulated inside the datagrams of the tunneling protocol. This in turn increases the packet size of the datagrams which becomes a critical issue due to an extra overhead when quality of service (QoS) must be maintained in the services of the IP radio access network.

Therefore, it will be convenient to superannuate and/or to dispense with the use of tunneling when IPv6 addressing scheme is taken into use in the Internet.

Discarding the tunneling in host to host connections in the IP radio access network means easier connection management from the network point of view, but on the other hand, there will arise new problem situations in connection with the routing of IPv6 datagrams to the mobile hosts.

In a tunneled solution, the tunnel termination point IP addresses for the base stations are known by the network, that is, the routes to these are static in the involved routing elements of the IP radio access network.

Now, when mobile terminal's IPv6 address (an IP address associated thereto, i.e. its own one or a temporarily allocated one) shall be used, the problem is that a mobile host's point of attachment to the Internet must be informed to the routing elements of the network each time a handoff to a new location (new base transceiver station cell area) must be executed while the mobile host is moving during an active connection. Otherwise, the mobile host's correct location is temporarily unknown in the routing elements of the network while a handoff occurs.

The major problem in the IP radio access network handoff procedure is that IPv6 datagrams forwarded to the mobile host will be lost during establishing of the new wireless connection and setting up of the new route for the IP datagrams within the IP radio access network.

During a handoff procedure, the IP packets forwarded to and intended to arrive at the mobile host are routed to the base station to which the mobile host was "connected" (via the air interface) before handoff as long as the new route is not being informed to the routing elements of the network and their routing tables become updated.

Particularly, this problem becomes worse as the mobile host itself is active in this route updating procedure, that is, it is responsible for route updating control towards the network. In order to accomplish this, the mobile host must wait until the wireless connection to the new base station is established, which is the earliest moment when the mobile host itself is able to start route updating activities via the new base station, that is, the mobile host's new last gateway towards the IP Radio Access Network.

This means that route updating for the routing elements of the network by the mobile host's control can only occur far too late in order to avoid lost IPv6 packets during handoff procedure. Thus, inevitably some Ipv6 data packets will be lost due to handoff procedure and quality of service (QoS) will be degraded.

An earlier solution to the described problem can be found in the IETF draft "Mobile IP-Cellular IP-00", which specifies a specific protocol that allows to route IP datagrams to a mobile host. The described protocol is intended to provide local mobility and handoff support. The introduced handoff solution is based on activities by the mobile host which transmits a route-update packet and redirects the packets destined for the involved mobile host from the old to the new base station.

The same assumption that a mobile host should be active in handoffs can be found also in the IETF drafts "Hierarchical Mobile Ipv4/v6 and Fast Handoffs" and "Mobility Support in Ipv6".

However, imposing the burden of the route updating to mobile hosts in mobile IP does not fully conform with the conceptional idea underlying the Internet because the network should provide a transparent platform for host to host communications which is independent of the underlying network technology.

SUMMARY OF INVENTION

Hence, the present invention provides an improved method for performing a mobile user terminal route update in a telecommunication network operated based on the Internet Protocol, which is free from the above mentioned drawbacks of prior art solutions.

The present invention is a method for performing a mobile user terminal route update in a telecommunication network operated based on the Internet Protocol, said network comprising at least two network transceiver device gateways each communicating with at least one mobile user terminal, at least one routing element providing a route for a communication connection between a mobile first user terminal and a second user terminal, said second user terminal communicating via a border gateway and said at least one routing element with said mobile first user terminal, and wherein each user terminal is identified by an Internet Protocol address, said method comprising the steps of detecting an occurrence of a handoff condition for said mobile first user terminal for a handoff from a first one to a second one of said at least two network transceiver device gateways, initiating a handoff procedure at the mobile first user terminal, the first and the second network transceiver device gateways and the border gateway, and transmitting the respective Internet Protocol addresses that identify those terminals which are communicating with each other by the corresponding gateway to be associated to the respective terminal after handoff, before completion of the handoff procedure.

According to respective further technical solutions said network is an Internet Protocol radio access network, said border gateway is a further network transceiver device gateway and said second user terminal is a further mobile user terminal, said routing element is a switch, and in case of a switch, said step of transmitting comprises that the Internet Protocol address associated with the mobile first user terminal is transmitted from the network transceiver device gateway, to which the handoff is to be performed, to the border gateway, and that the Internet Protocol address associated with the second user terminal is transmitted from the border gateway to the network transceiver device gateway, to which the handoff is to be performed, and in case of a switch, said Internet Protocol address associated with said respective terminal is transmitted within a single Internet Protocol data packet, said routing element is a router, and in case of a router, said step of transmitting comprises that the Internet Protocol address associated with the mobile first user terminal is transmitted from the network transceiver device gateway, to which the handoff is to be performed, to the router, and that the Internet Protocol address associated with the second user terminal is transmitted from the border gateway to the router, and in case of a router, said Internet Protocol address associated with said respective terminal is transmitted within a routing information update message, whether in case of a switch or a router, Ipv6 addressing is used in communication between the communicating terminals.

Also, according to the present invention, a respective control device performs the above method in case of a switch or in case of a router as a routing element wherein said control device comprises control means distributed over the gateways and a control plane of the network.

Thus, the control device and its control means are implemented in the IP base stations, in the control plane and the border gateways of the IP radio access network, while the route update method, added to existing handoff scenarios, occurs at a proper moment.

As mentioned above, the present invention is a general solution for speeding up the mobile host route updating process in the IP radio access network handoff scenarios between base stations within the same autonomous system which can be applied in switched network as well as in routed network solutions.

According to the present invention, during the mobile host handoff to a new base station, that is, after initiation of the handoff but still before completion of the handoff, the routing elements of the IP radio access network switch/route the IPv6 datagrams forwarded to the (moving) mobile host from the previous base station direction to the new base station direction. On other hand, the IPv6 datagrams sent from the mobile host itself find their route to the border gateway of the IP radio access network via which the far end host is receiving these datagrams. These route updates, that is, change of directions, occur extremely fast and are synchronized by the network (control plane) to thereby avoid interruptions in a mobile host's communication while maintaining QoS requirements.

According to the present invention, stated in other words, a solution for an IP radio access network with a switched network implementation is for example as follows:

A) When the wireless connection establishment (handoff) between the mobile host and a base station which prepares itself to be the new gateway to the mobile host is still ongoing, the involved (future new) base station sends one IP packet with the IP address that is associated with the mobile host as a source address to the termination point (border gateway) from which the far-end Host's IPv6 datagrams are forwarded to the IP Radio Access Network in order to inform about the new route to the moved mobile host via all the involved switches within the autonomous IP radio access network. That is, the (future new) base station steals the identity of the mobile host for just one IP packet in order to speed up the new route setup.

B) During the same handoff scenario and thus at substantially the same time, the control plane of the IP radio access network initiates the involved border gateway to send one IP packet with the IP address that is associated with the far-end host as a source address to the new base station (to which the handoff is being performed) from which the mobile host's IPv6 datagrams are forwarded to the border gateway after handoff in order to inform about the new route from the moved mobile host via all the involved switches within the autonomous IP radio access network. That is, the border gateway steals the identity of the far-end host for just one IP packet in order to speed up the new route setup.

The scenario in a routed network differs from the above due to the fact that routers, as a kind of routing elements differing from switches, learn new routes only by receiving routing information update messages from adjacent routers or by configuration. The proposed solution according to the present invention for an IP radio access network with a routed network implementation, stated in other words, is therefore, for example as follows:

A) The scenario is similar to switched network case except that the involved base station (the one to which the mobile host is handed off) sends a route updating message with the IP address that is associated with the mobile host to the IP radio access network in order to inform about the new route to the mobile host via all the routers within the autonomous IP Radio Access Network.

B) The scenario is similar to the case of a switched network except that the involved border gateway sends a route updating message with the IP address that is associated with the far-end host to the IP radio access network in order to inform about the new route from the moved mobile host to the border gateway via all the routers within the autonomous IP radio access network.

It is to be understood that the involved base stations and the border gateway in the handoff scenario are supplied, e.g. by the network control plane, with information about host identifications and the termination points of the ongoing traffic between the hosts within the IP radio access network in order to set proper addresses in the route updating packets. The control plane of the radio access network which is aware of all the active connections in the autonomous system can provide information concerning these to the base stations and to the border gateway which are involved in the handoff procedure.

Thus, the present invention as outlined above allows updating the mobile host's data flow route already during handover (handoff) in advance, that is, before the mobile host's communication continues wireless via the new base station. This means that the new route towards the hosts in the involved routing elements of the network will be set up before the Last Hop connection via the air interface of the base station is established. Consequently, the new base station will loose significantly less (when compared with previous solutions) or even none of the incoming IP packets targeted/forwarded to the mobile host. On the other hand the present invention does not require any activities to be performed by the mobile host (user terminal) and also the required controlling effort from the IP radio access network is kept minimum.

Thus, according to the present invention, at least the following improvements can be achieved:

The control of the required route update during the handoff scenario is kept in the IP radio access network and hidden from the IP mobile terminals, that is, unwanted additional tasks for mobile IP terminals during active connections are eliminated. This principle suits better the original idea of the Internet.

The mobile IP terminals can use their standardized location management and handoff mechanisms of the underlying radio access network technology without modifications.

The solution is simple as standard routing updating mechanisms of the IP network are applied. Hence, there is no need for conceiving and implementing new protocols.

The present invention overcomes the problem of late route updating control during handoff which causes loss of IPv6 datagrams in the mobile host connection with QoS requirements.

Additionally, the present invention provides at least the following advantages:

Cellular IP local mobility, that is, mobility inside an IP radio access network becomes easier. In general the required extensions to mobile IP for cellular IP support can be solved in a simpler way as compared to the current proposals.

Cellular base stations in IP radio access network can be considered as the mobile IP terminal's Last Hop Gateways to the Internet which provide automatic mobility support to moving user terminals.

Management of the radio resources in the base station's wireless connections (air interface) can be kept in the control plane of the IP radio access network, namely, where it has been forever in the existing radio access network solutions.

Mobile IP terminals can rely on current location management and handoff mechanisms of the underlying radio access network technology without modifications. Hence, the well working existing techniques need not to be changed due to Cellular IP.

The method of the invention applies also with mobile terminal services that are associated with a temporary IP address by the IP radio access network e.g. a traditional speech service for non-IP mobile terminal where the network must allocate a temporary IP address that identifies the mobile terminal in order to transport speech packets over IP through the IP based radio access network.

The required changes in the base stations of the IP radio access network are kept to a minimum so that the route update control task can be joined easily to the existing handoff scenarios.

The method and corresponding devices according to the present invention provide a solution for IPv6 which allows use of a mobile terminal host to host connection via Internet by using just terminal IP addresses throughout the network without any address conversions or tunneling, regardless of a terminal's current point of attachment to the Internet.

The method and corresponding devices according to the present invention can be implemented in the IP radio access network to provide use in parallel with the existing IPv4 mobile IP mechanisms.

A solution is provided for IP radio access networks with a switched or with a routed network implementation.

The present invention can be applied without modifications in a "semi-soft" handoff, if an intelligent routing element of the IP radio access network is set to automatically forward the IP packets to the old and to the new base station for a predetermined time after each route update command (route update message). Hence, an implementation of a "semi-soft" handoff is substantially facilitated.

The route updating mechanism according to the present invention is required only in conjunction with handoffs within autonomous IP radio access networks and thus allows use of the existing mechanisms in mobile IP for location management, session initialization and handoffs to an other autonomous IP radio access network without modifications.

The present invention, when implemented, requires at least the following modifications:

The IPv6 addressing scheme is to be used in the Mobile IP Terminal host to host connections. (However, of course, the present invention is not limited to the sole use of the IPv6 addressing scheme, but any other suitable addressing scheme may be applicable, as long as said other addressing scheme preserves the advantages of IPv6 over IPv4, which are specific in the context of the present invention, namely, any other addressing scheme which avoids tunneling can be used in connection with the present invention.)

A new route update control task must be implemented in the base stations of the IP Radio Access Network so that the existing handoff scenarios must be modified a bit.

A new route update control task must be implemented in the border gateway of the IP radio access network which means that a control interface is required from the control plane of the IP radio access network to the border gateway in order to command it to send route update message.

BRIEF DESCRIPTION OF THE DRAWINGS

The present invention and its features and advantages will become more fully apparent when referring to the detailed description of the accompanying Figures, in which.

DETAILED DESCRIPTION OF THE PREFERRED EMBODIMENTS

It is to be noted that the drawings illustrate only those parts of the telecommunication network which are essential in connection with the present invention and, for simplicity of drawing and explanation, that the illustrated number of respective parts is reduced to a minimum number.

Figure 1:
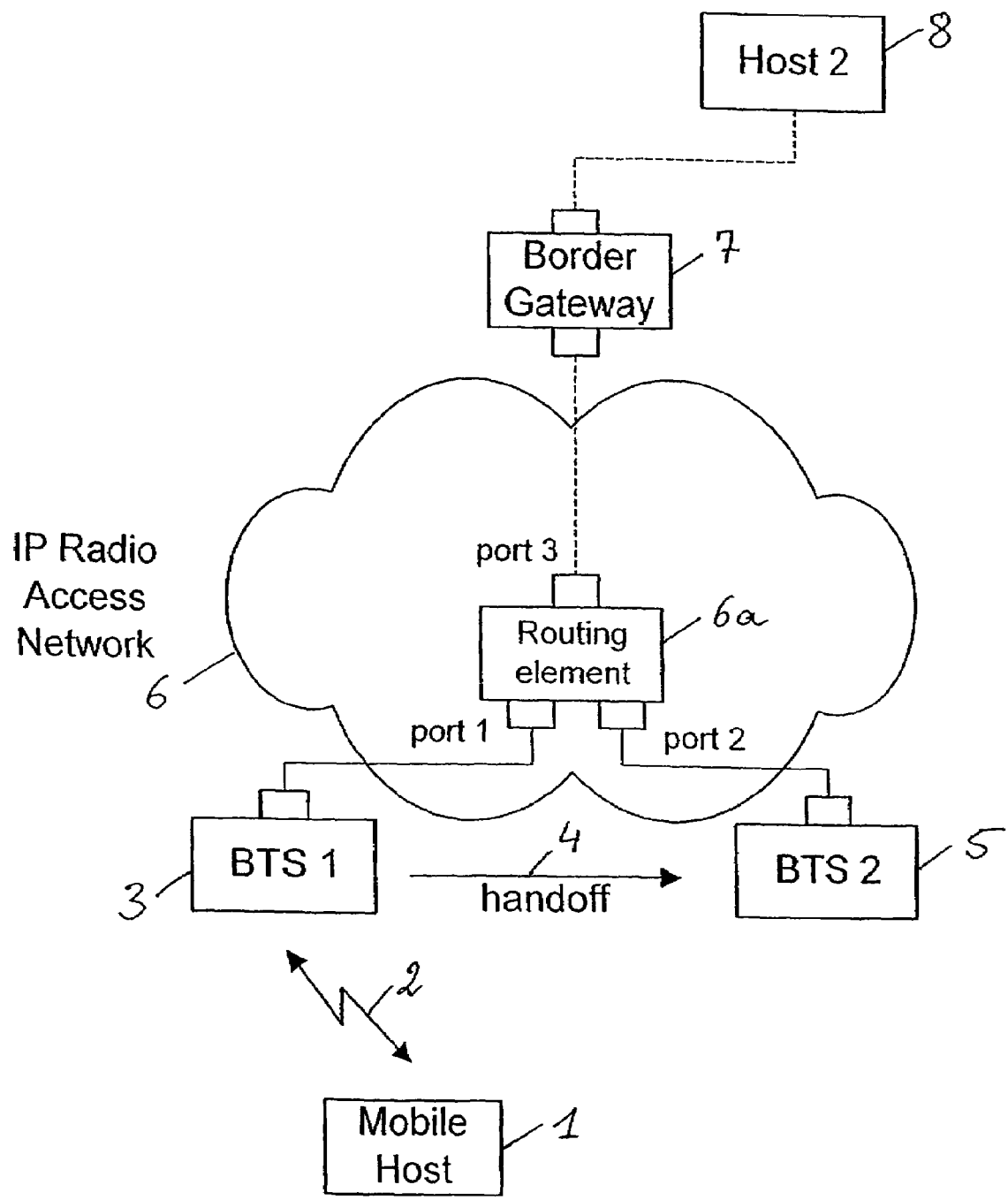
FIG. 1 illustrates a handoff scenario within an IP radio access network local area, and FIG. 2. Illustrates a handoff scenario between a same network operator's IP radio access network local areas.

FIG. 1 illustrates a handoff scenario within an IP radio access network local area as a telecommunication network operated based on the Internet protocol.

A mobile host as a mobile user terminal (or user equipment in case of a UMTS terminal) is denoted by reference numeral 1. This mobile host communicates via an air interface denoted by reference numeral 2 with a first base transceiver station BTS1, denoted by numeral 3, which represents a network transceiver device gateway. In order that a handoff may take place for the moving mobile user terminal 1, at least one other network transceiver device gateway (base transceiver station BTS2 in the drawing) is required in the network, which is denoted by numeral 5. FIG. 1 shows the situation in which a handoff condition (illustrated by an arrow denoted by numeral 4) is detected due to a movement of the mobile host 1 from the serving area of the base transceiver station 3 to the service area of the base transceiver station 5. Nevertheless, other known handoff conditions are also applicable in connection with the present invention. Both base transceiver stations, 3 and 5, are connected at respective ports, port1 and port2, to a routing element 6*a* of the IP radio access network 6. The routing element 6*a* may either be a switch in case of a so-called switched network or a router in case of a so-called routed network. FIG. 1 covers both situations. At a third port, port3, the routing element 6*a* is connected to a border gateway 7 via which the mobile user terminal 1 finally communicates with a host 8 (far-end terminal, e.g. a communication partner). Of course, a routing element may have more than three ports. However, in order that within one transmission direction a routing may occur in the sense that an information flow may selectively be directed to another destination (end terminal), three ports is a minimum number of ports for a routing element.

With reference to FIG. 1, the method according to the present invention is now described for both cases, a switched as well as a routed network.

In case of a switched network:

Normally the layer 3 switch 6*a* as a routing element forwards traffic based on layer 3 addresses and performs switching, and may or may not perform route processing. There are several different technologies by which layer 3 switches can learn routes based on the received data.

The handoff in a data network for switched user plane (U-plane) can work in the following way (see FIG. 1), when assuming the following preconditions (as described above):

The switch 6*a* is connected to both, BTS1 (numeral 3) via port1 and to BTS2 (numeral 5) via port2 and it is connected to the border gateway 7 via port3, which border gateway 7 in turn has another connection to the rest of the network, such as a host terminal 2. The mobile host 1 and the far-end host2 (numeral 8) have a QoS class connection active.

Step 1: In such a situation, at first the mobile host 1 is connected to BTS1 (numeral 3) via the air interface 2. The BTS1 passes data to switch 6a as a routing element. Then, the switch table has the following contents:
- port 1 assigned to mobile host 1,
- port 2—(unassigned),
- port 3 assigned to Host2 (numeral 8).

Step 2: Then, the mobile host 1 moves, as indicated by the arrow 4, to an area of a new network transceiver device gateway 5 (BTS2) and the network 6 (network control plane, e.g. implemented in a radio network control (RNC) device (not shown)) detects that a handoff to BTS2 is required.

Step 3: The network then prepares the mobile host 1, BTS1, BTS2 and the border gateway 7 for handoff and thus initiates the handoff procedure.

Step 4: Upon initiation of the handoff but still before completion thereof, BTS2 sends an IP packet containing the IP address that is associated with the mobile host 1 as a source address targeted and/or directed to the termination point (border gateway 7) from which the far-end host's (denoted by 8) traffic arrives to the IP radio access network.

Step 5: The switch 6a learns (i.e. is informed) that the mobile host 1 is now to be connected via port2 of the switch, as it will communicate with BTS2 when the handoff is completed.

Then, the switch table has the following contents:
- port1—(unassigned),
- port2 assigned to mobile host 1,
- port3 assigned to Host2

Step 6: Data received from Host2 is then forwarded to BTS2 where mobile host's handoff is targeted, i.e. to which the mobile host 1 performs the handoff.

Step 7: The border gateway 7 sends IP packet with the IP address that is associated with Host2 as a source address targeted and/or directed to BTS2 (as the corresponding new termination point).

Step 8: The switch 6a learns that Host2 is to be connected and/or is connected (after completion of handoff) via port3. In this case nothing changes but if there are more than one switch and branch in between, this route updating is also necessary.

Namely, assuming for example a two-level switch arrangement (not shown in the figures), each switch having an arrangement as switch 6a (i.e. each switch having three ports only). Then, a border gateway can be assumed to be connected to a first level switch, which provides a branch to two second level switches. And each second level switch may be assumed to provide in turn respective branches to two network transceiver device gateways. In case of a handoff occurring between network transceiver device gateways associated with to different second level switches and a Host2 is connected to the border gateway as in the above case, then also the above mentioned route updating for the Host2 is necessary.

It is to be noted that although the above description of the steps alleges a somewhat serial and consecutive execution of the individual steps, the route updating (also referred to as "route discovery" in some IETF drafts (IETF=Internet Engineering Task Force)) is carried out from both gateway directions, that is, originates from the border gateway as well as from the last hop gateway. Hence, the execution of the above described steps can occur in parallel under control of the network control plane. In particular, the network control plane schedules the execution of the steps in such a manner that the individual events can be adapted to existing handoff scenarios as defined in GSM or in UMTS. As a result, the present invention, which may be regarded as a function existing as a service in the network, is compatible to different standards.

In case of a routed network:

Normally, the basic router functionalities include route processing (path determination and table maintenance) and traffic forwarding (address resolution, counter maintenance and header rewriting). Routing is topology oriented and routers filter all broadcast traffic.

The above described scenario (as described in connection with FIG. 1) in a routed network differs from the above by the fact that routers learn new routes only by receiving routing information updates from adjacent routers or by configuration.

Thus after the above step 3, in which the BTS2 (denoted by 5) is prepared for handoff, the BTS2 sends a routing information update message to the router as a routing element (in case of a routed network, the switch is replaced by a router 6a). In this way the router 6a learns a new route to the correct destination early enough so that no data is lost.

This router solution has a slight drawback of sending other than payload data which produces some overhead. However, this is not a problem if handoff activity is not too frequent (a handoff activity is considered to be too frequent if it is faster than about once in a second), so that the handoff frequency should be below one handoff per second in order not to cause problems.

As mentioned earlier herein above, whether in connection with a switched or a routed network, the border gateway 7 can be another base station, i.e. a transceiver device gateway, in the IP radio access network if Host2 (denoted by numeral 8) is a mobile user terminal and is connected via that base station to the network. If the Host2 is also a mobile terminal and is connected to the same IP radio access network via some other base station, and is also moving and requires handoff at the same time as the mobile host 1, then the control plane of the IP radio access network must schedule these two handoff scenarios to occur in such a timed manner so that the routing elements of the network are set up correctly.

Figure 2:
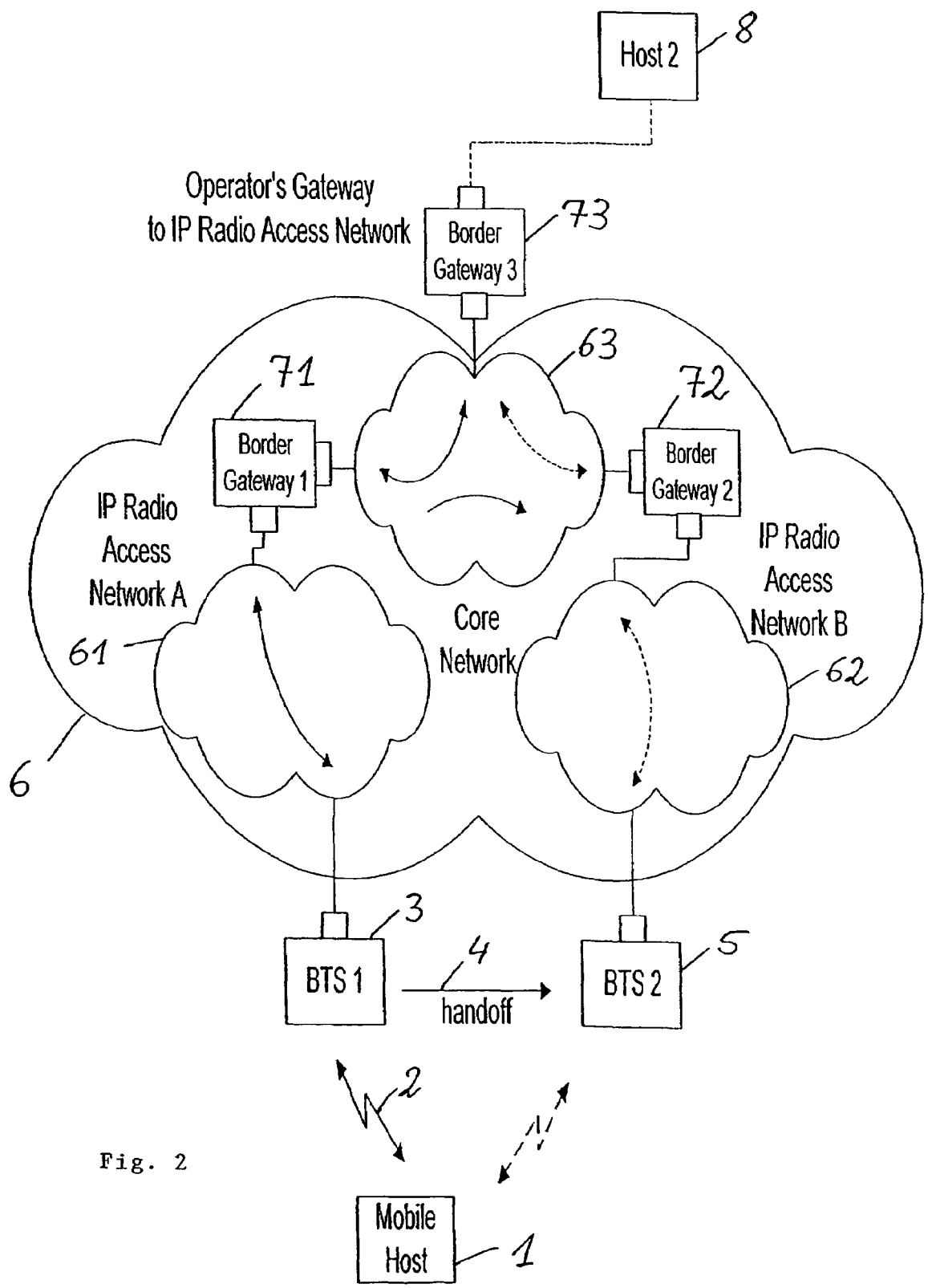

FIG. 2 shows a handoff between two IP radio access network local areas of the same operator. This figure serves to illustrate that the invention is scaleable.

In detail, in FIG. 2, the same reference numerals denote the same or like network parts and/or devices. As shown, a mobile host 1 as a mobile user terminal communicates with a base transceiver station BTS1 as a network transceiver device gateway 3 via the air interface 2. The network transceiver device gateway 3 is one (of a plurality, of which plurality, for reasons of simplicity of drawing, only one is shown) which is associated to a first IP radio access network (IP RAN A), denoted by 61. Similarly, a network transceiver device gateway 5 is associated with a second IP radio access network (IP RAN B), denoted by 62. Upon movement of the mobile host/mobile user terminal 1, from the service area of the BTS1 to the one of the BTS2, as indicated by an arrow 4, a handoff condition is detected which as a result will lead to the mobile host 1 communicating via the air interface 2 with the BTS2, as indicated by a dashed double arrow. The internal arrangement of the IP RAN's A and B (61 and 62) is as described in connection with FIG. 1 earlier above, that is, they contain a routing element which may be a switch or a router. Also, it is to be noted that the different IP RAN's need not necessarily be both a switched network or both a routed network. Stated in other words, the entire IP RAN as denoted by 6 may comprise subnetworks such as IP RAN A and B, one of which being a switched and the other of which being a routed (sub-) network. Also, the number of two subnetworks has only been chosen to keep the illustration simple for explanation purposes. Of course, an IP radio access network 6 may comprise a plurality of more than two subnetworks.

Each subnetwork, IP RAN 61 and 62, is provided with a border gateway 71 and 72, respectively, which works like the gateway 7 described in connection with FIG. 1. Via these border gateways 71 and 72, respectively, the respectively associated IP radio access networks 61 and 62 communicate with a core network 63 of the entire radio access networks. The core network performs control of the subnetworks. The core network 63, in turn, is provided with a border gateway 73, via which a communication connection to a far-end host 8 is established. Also, the core network contains a routing element (not shown) which selects a route to one of the associated IP RAN subnetworks.

In other words, initially, the mobile host communicates via the air interface 2, the BTS1 3, the IP RAN 61, the border gateway 71, the core network 63 and the border gateway 73 with the far-end host (Host2) 8. After the handoff has been performed, the route has then been changed to mobile host 1, the air interface 2, the BTS2 5, the IP RAN 62, the border gateway 72, the core network 63, the border gateway 73, the far-end host (Host2) 8. Of course, the indicated order is for a communication from the mobile user terminal towards the terminal 8, while of course the reverse order is valid for the communication from the host 8 to the mobile user terminal 1.

The method for performing a mobile user terminal route update in such a telecommunication network operated based on the Internet Protocol, is similar to the one as described in detail with reference to FIG. 1 above. A difference is merely that at least another routing level is added, as the core network 63 selects a route to the proper subnetwork (IP RAN 61 and/or 62).

Also, the present invention as described herein before is independent of specific routing protocols which differ between different manufacturer's networks. Hence, the present invention can be applied to any routing protocol adopted in a specific manufacturer's network.

Also, a modification of the present invention (in connection with switched as well as with routed networks) for a so-called "semi-soft" handoff is conceivable. That is, if an intelligent routing element of the IP radio access network is provided and is set to automatically forward the IP packets to the old and to the new base station for a predetermined time after each route update command (route update message), an implementation of such a "semi-soft" handoff is substantially facilitated.

Accordingly, as the method of the invention is applicable with mobile terminal services that are associated with a temporary IP address by the IP radio access network (e.g. a traditional speech service for a non-IP mobile terminal where the network must allocate a temporary IP address that identifies the mobile terminal in order to transport speech packets over IP through the IP based radio access network), the use of any other IP address than a permanent IP address is allowed. Stated in other words, the present invention is not only applicable to cases in which the mobile terminal itself has a permanent IP address (i.e. is an IP mobile terminal) but also to cases in which the IP RAN is required to allocate some temporary IP address to a mobile terminal (i.e. to a non-IP mobile terminal) for carrying non-IP service data through the IP network.

As has been described herein before, the present invention is a method for performing a mobile user terminal route update in a telecommunication network operated based on the Internet Protocol, said network comprising at least two network transceiver device gateways each communicating with at least one mobile user terminal, at least one routing element providing a route for a communication connection between a mobile first user terminal and a second user terminal, said second user terminal communicating via a border gateway and said at least one routing element with said mobile first user terminal, and wherein each user terminal is identified by an Internet Protocol address, said method comprising the steps of detecting an occurrence of a handoff condition for said mobile first user terminal for a handoff from a first one to a second one of said at least two network transceiver device gateways, initiating a handoff procedure at the mobile first user terminal, the first and the second network transceiver device gateways and the border gateway, and transmitting the respective Internet Protocol addresses that identify those terminals which are communicating with each other by the corresponding gateway to be associated to the respective terminal after handoff, before completion of the handoff procedure. Also, the present invention is a control device.

It should be understood that the above description and accompanying drawings are only intended to illustrate the present invention by way of example only. The preferred embodiments of the present invention may thus vary within the scope of the attached claims.

The invention claimed is:

1. A method, comprising:
    providing a route for a communication connection between a first mobile user terminal and a second user terminal via at least one routing element;
    communicating, between the second user terminal and the first mobile user terminal, via a border gateway and the at least one routing element;
    detecting an occurrence of a handoff condition for the first mobile user terminal for a handoff from a first one to a second one of at least two network transceiver device gateways each being adapted to communicate with at least one mobile user terminal, each user terminal being identified by an Internet Protocol address;
    initiating a handoff procedure at the first mobile user terminal, the first and the second network transceiver device gateways and the border gateway; and
    transmitting, before completion of the handoff procedure, the Internet Protocol address that identifies the first mobile user terminal from the network transceiver device gateway to be associated to the first mobile user terminal after handoff, and the Internet Protocol address that identifies the second user terminal from the border gateway.

2. The method according to claim 1, wherein said network is an Internet Protocol radio access network.

3. The method according to claim 2, wherein said border gateway is a further network transceiver device gateway and wherein said second user terminal is a further mobile user terminal.

4. The method according to claim 1, wherein said border gateway is a further network transceiver device gateway and wherein said second user terminal is a further mobile user terminal.

5. The method according to claim 1, wherein said routing element is a switch.

6. The method according to claim 5, wherein transmitting farther comprises transmitting the Internet Protocol address identifying the first mobile user terminal from the network transceiver device gateway, to which the handoff is to be performed, to the border gateway, and transmitting the Internet Protocol address identifying the second user terminal from the border gateway to the network transceiver device gateway, to which the handoff is to be performed.

7. The method according to claim 6, wherein the Internet Protocol address associated with said respective terminal is transmitted within a single Internet Protocol data packet.

8. The method according to claim 1, wherein said routing element is a router.

9. The method according to claim 8, wherein the transmitting further comprises transmitting the Internet Protocol address identifying the first mobile user terminal from the network transceiver device gateway, to which the handoff is to be performed, to the router, and transmitting the Internet Protocol address identifying the second user terminal from the border gateway to the router.

10. The method according to claim 9, wherein said Internet Protocol address associated with said respective terminal is transmitted within a routing information update message.

11. The method according to claim 1, wherein Ipv6 addressing is used in communication between the communicating user terminals.

12. A control device, comprising:
controller configured to provide a route for a communication connection between a first mobile user terminal and a second user terminal via at least one routing element;
controller configured to provide for communication, between the second user terminal and the first mobile user terminal, via a border gateway and the at least one routing element;
controller configured to detect an occurrence of a handoff condition for the first mobile user terminal for a handoff from a first one to a second one of at least two network transceiver device gateways each being adapted to communicate with at least one mobile user terminal, each user terminal being identified by an Internet Protocol address;
controller configured to initiate a handoff procedure at the first mobile user terminal, the first and the second network transceiver device gateways and the border gateway; and
controller adapted to instruct the network transceiver device gateway to be associated to the first user terminal after handoff, to transmit before completion of the handoff procedure the Internet Protocol address that identifies the first user terminal, and to instruct the border gateway to transmit the Internet Protocol address that identifies the second user terminal.

13. The control device according to claim 12, wherein said routing element is a switch and said controller is adapted to instruct that the Internet Protocol address identifying the first mobile user terminal is transmitted from the network transceiver device gateway, to which the handoff is to be performed, to the border gateway, and to instruct that the Internet Protocol address identifying the second user terminal is transmitted from the border gateway to the network transceiver device gateway, to which the handoff is to be performed.

14. The control device according to claim 12, wherein said routing element is a router and said controller is adapted to instruct that the Internet Protocol address identifying the first mobile user terminal is transmitted from the network transceiver device gateway, to which the handoff is to be performed, to the router, and to instruct that the Internet Protocol address identifying the second user terminal is transmitted from the border gateway to the router.

15. The control device according to claim 12, wherein said control device comprises controller distributed over the gateways and a control plane of the network.

16. A method, comprising:
detecting an occurrence of a handoff condition for a first mobile user terminal for a handoff from a first one to a second one of at least two network transceiver device gateways each being adapted to communicate with at least one mobile user terminal, each user terminal being identified by an Internet Protocol address;
initiating a handoff procedure; and
transmitting, before completion of the handoff procedure, the Internet Protocol address that identifies the first mobile user terminal from the network transceiver device gateway to be associated to the first user terminal after handoff.

17. An apparatus, comprising:
a detector configured to detect an occurrence of a handoff condition for a first mobile user terminal for a handoff from a first one to a second one of at least two network transceiver device gateways each being adapted to communicate with at least one mobile user terminal, each user terminal being identified by an Internet Protocol address;
an initiator configured to initiate a handoff procedure; and
a transmitter configured to transmit, before completion of the handoff procedure, the Internet Protocol address that identifies the first mobile user terminal from the network transceiver device gateway to be associated to the first user terminal after handoff.

18. A method, comprising:
detecting an occurrence of a handoff condition for a first mobile user terminal for a handoff from a first one to a second one of at least two network transceiver device gateways each being adapted to communicate with at least one mobile user terminal, each user terminal being identified by an Internet Protocol address;
initiating a handoff procedure; and
transmitting, before completion of the handoff procedure, the Internet Protocol address that identifies a second user terminal from a border gateway, the second user terminal communicating with the first mobile user terminal, via the border gateway and at least one routing element.

19. An apparatus, comprising:
a detector configured to detect an occurrence of a handoff condition for a first mobile user terminal for a handoff from a first one to a second one of at least two network transceiver device gateways each being adapted to communicate with at least one mobile user terminal, each user terminal being identified by an Internet Protocol address;
an initiator configured to initiate a handoff procedure; and
a transmitter configured to transmit, before completion of the handoff procedure, the Internet Protocol address that identifies a second user terminal from a border gateway, the second user terminal communicating with the first mobile user terminal, via the border gateway and at least one routing element.

* * * * *